United States Patent [19]

Geilich

[11] Patent Number: 5,026,812
[45] Date of Patent: Jun. 25, 1991

[54] ORGANOPOLYSILOXANE COMPOSITION CURABLE TO AN ELASTOMER AND USE THEREOF

[75] Inventor: Klaus M. Geilich, Wiesbaden, Fed. Rep. of Germany

[73] Assignee: Dow Corning GmbH, Vienna, Austria

[21] Appl. No.: 433,934

[22] Filed: Nov. 9, 1989

[30] Foreign Application Priority Data

Nov. 24, 1988 [GB] United Kingdom ............... 8827466

[51] Int. Cl.$^5$ ........................................... C08G 77/06
[52] U.S. Cl. ...................................... 528/17; 524/724; 528/18; 528/20; 528/21; 528/34
[58] Field of Search ....................... 528/20, 21, 34, 17, 528/18

[56] References Cited

U.S. PATENT DOCUMENTS 4,546,017 10/1985 Flackett et al. ...................... 427/387
4,720,530 1/1988 Würminghausen et al. ......... 528/18

FOREIGN PATENT DOCUMENTS 856321 12/1960 United Kingdom .
1139423 1/1969 United Kingdom .

*Primary Examiner*—Melvyn I. Marquis
*Attorney, Agent, or Firm*—Roger H. Borrousch

[57] ABSTRACT

The specification describes and claims a composition curable to an elastomer in the presence of moisture and characterized in that it comprises the product obtained by mixing (A) 100 parts by weight of a polydiorganosiloxane having at least two silicon-bonded hydroxyl groups and wherein at least 50 percent of the total organic substituents are methyl groups, (e.g. according to the genertal formula H(OSiR"$_2$)$_x$OH wherein substantially all of the groups R" are methyl groups and x is an integer having an average value from 250 to 1500), (B) from 1 to 40 parts by weight of one or more oxime silanes of the general formula

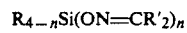

$$R_{4-n}Si(ON=CR'_2)_n$$

wherein each R represents an alkyl group having less than 6 carbon atoms, a vinyl group, an allyl group or a phenyl group, each R' represents an alkyl group having from 1 to 6 carbon atoms or a phenyl group and n has an average value of from 2.1 to 3 and (C) from 0.1 to 1.5 parts by weight of one or more alkanolamines wherein the alkanolamine (C) is preferably a monohydroxy alkanolamine and is preferably 2-amino-2-methyl-1-propanol.

9 Claims, No Drawings

ORGANOPOLYSILOXANE COMPOSITION CURABLE TO AN ELASTOMER AND USE THEREOF

This invention relates to organopolysiloxane compositions which are curable to elastomers and also relates to the use of such elastomers as sealants.

Organopolysiloxane compositions which cure to elastomeric solids on exposure to water are well-known. Such compositions have found wide application as sealing materials for a variety of structures to which they may be applied and allowed to form elastomers merely by exposure to atmospheric moisture. Typically such compositions comprise a polydiorganosiloxane and a crosslinking agent for the polydiorganosiloxane, for example an alkoxy silane, an acetoxy silane, an amino or an oxime silane. In addition the compositions may also contain one or more catalysts, fillers, pigments, adhesion promoters and other ingredients.

One important application of the above-described curable compositions is their use as sealants in the building industry. For such applications, for example in the fabrication and installation of glazed units the cured elastomer should adhere strongly to glass, aluminium, zinc and/or concrete. The elastomer should also have a relatively low modulus of elasticity which would permit it to adapt to the relative movement of the building in which it is used due, for example, to the effects of temperature variation, wind and other stresses. These requirements of adhesion and low modulus are sufficiently important that certain countries have established national standards relating to the use of sealants, for example, in glazing and building joint applications.

Moisture curable organopolysiloxane compositions which employ oximosilanes as crosslinking agents have properties before and after curing e.g. shelf life, cure rate and physical properties of the elastomeric solid which render them attractive for use in various applications. However, in general their adhesion properties to substrates other than glass are less than desired, and it is necessary to include adhesion promoters in the composition or to prime the substrates. One material which has been employed as adhesion promoter is gamma aminopropyltriethoxysilane; by varying the proportion of this material present the man skilled in the art may correspondingly vary adhesion properties of the composition. However, presence of $\gamma$-aminopropyltriethoxysilane in moisture curable organopolysiloxane compositions which employ oximosilanes as crosslinking agents not only affects adhesion properties but also influences cure characteristics of the composition as evidenced by shelf life, tack free time and physical properties of the cured product. This becomes especially noticeable if comparatively large proportions of the aminosilane are present. Also, the amino groups present appear to be responsible for "yellowing" of the cured seal.

We have now found that the speed of cure of a moisture curable oranopolysiloxane composition which employs an oximosilane as crosslinking agent may be controlled by inclusion in the composition of an alkanolamine.

The present invention provides in one of its aspects a composition curable to an elastomer in the presence of moisture and comprising the product obtained by mixing (A) 100 parts by weight of a polydiorganosiloxane having at least two silicon-bonded hydroxyl groups and wherein at least 50 percent of the total organic substituents are methyl groups, (B) from 1 to 40 parts by weight of one or more oxime silanes of the general formula

wherein each R represents an alkyl group having less than 6 carbon atoms, a vinyl group, an allyl group or a phenyl group, each R' represents an alkyl group having from 1 to 6 carbon atoms or a phenyl group and n has an average value of from 2.1 to 3 and (C) from 0.1 to 1.5 parts by weight of one or more alkanolamines.

Also included within the scope of this invention are the cured elastomeric product of the said compositions and the use of such compositions for sealing joints, cavities and the like.

In the polydiorganosiloxanes (A) the organic substituents are selected from lower aliphatic hydrocarbon groups e.g. methyl, ethyl, propyl or vinyl, phenyl groups and fluorinated hydrocarbon groups e.g. 3.3.3-trifluoropropyl groups. At least 50 percent of the total organic substituents should be methyl groups, the preferred polydiorganosiloxanes being those wherein substantially all of the organic substituents are methyl. The viscosity of the polydiorganosiloxane employed is not critical but preferably lies within the range from 500 to 200,000 mPa.s at 25° C. Most preferred are the polydimethylsiloxanes having a viscosity within the range from 1000 to 75,000 mPa.s at 25° C. Preferred polydiorganosiloxanes are those having terminal silicon-bonded hydroxyl groups. These polydiorganosiloxanes are well known substances. They are widely employed in the production of moisture-curable silicone compositions and can be represented by the general formula

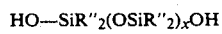

wherein each R" represents an organic substituent, e.g. methyl, and x is an integer, preferably having an average value of from about 250 to about 1500.

In the general formula of the oxime silanes (B) the substituents R may be for example methyl, ethyl, propyl, vinyl, allyl or phenyl and R' may be an alkyl group as exemplified for R or a phenyl group. The preferred oxime silanes are those wherein R represents methyl, ethyl or vinyl, each R' represents methyl or ethyl and n is 3. Examples of the operative silanes (B) are methyl tris (methylethylketoxime)silane, vinyl tris(methylethylketoxime) silane, methyl tris(diethylketoxime) silane and phenyl tris(methylethylketoxime)silane. Sufficient of this silane is employed to ensure adequate stability of the composition during storage and adequate crosslinking of the composition when exposed to moisture. The preferred amount is generally from about 4 to about 18 parts by weight.

The alkanolamine (C) used in a composition according to the invention preferably has a single hydroxyl group in its molecule, although those having two or more hydroxyl groups may be employed if desired. The alkanolamine preferably has a single amino group in its molecule and preferably this single amino group is a primary amino group. Furthermore, the alkanolamine preferably has an alkyl substituted aliphatic hydrocarbon chain. One may employ, for example, monoethanolamine ($H_2N-(CH_2)_2OH$), but the preferred alkanolamine is 2 amino-2-methyl-1-propanol $CH_3C(CH_3)(NH_2)CH_2OH$. The alkanolamine serves to accelerate cure of the composition when the composition is exposed to moisture as indicated by a reduced skin over time of the composition. The proportion of alkanolamine (C) used in the composition is determined in accordance with the cure rate required of the composition. The maximum amount present is determined by compatibility considerations, more than 1.5 parts generally being unacceptable as the alkanolamine separates from the composition during storage before use. Amounts of 1.5 parts of the preferred alkanolamine are sufficient to reduce the skin over time of a composition according to the invention by a substantial proportion. A particular advantage which results from the use of the monoalkanolamines (C) is the ability to adjust the cure speed of the composition without varying the proportion of trialkoxysilane used and consequently without simultaneously increasing the degree of crosslinking of the composition. This permits greater freedom in the selection of other materials to be employed in the composition which influence the cure speed. When the preferred alkanolamine is employed the adhesion properties of the composition are also beneficially affected, so that in such a case one may employ no, or at least a substantially reduced proportion of the, aminotrialkoxy silane as adhesion promotor.

In those cases in which an even more rapid cure is required, we prefer to include in a composition according to the invention an alkoxysilane of the general formula $R_{4-p}Si(OR')_p$ wherein each R and R' are as aforesaid and p has the value 2, 3 or 4. The preferred alkoxysilanes are those wherein R represents methyl, ethyl or vinyl, R' represents methyl, ethyl or methoxyethyl and p has the value 3. These materials contribute to polymerisation of the composition but larger proportions render the composition unstable in storage. Accordingly the alkoxysilanes should not be used in amounts of more than about 2.5 parts by weight of the composition.

In preferred compositions according to the invention which contain about 8 parts of the preferred oximosilane and about 2 parts of the preferred alkoxysilane, amounts of 0.5 part by weight of the preferred alkanolamine are sufficient to provide a composition having a skin over time of 25 minutes, and amounts of about 1 part by weight of the preferred alkanolamine are sufficient to provide a composition having a skin over time of less than 15 minutes and also capable of excellent adhesion to glass, aluminium, zinc and concrete.

If desired, one may include in a composition according to the invention up to about 20 parts of a complex of titanium. These materials influence cure rate and adhesion of the composition. They are titanium chelates represented by the general formula

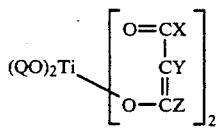

wherein each Q represents a group having from 2 to 6 carbon atoms and selected from hydrocarbon groups and groups composed of carbon, hydrogen and oxygen in the form of ether linkages, X and Z each represent an alkyl group having from 1 to 4 inclusive carbon atoms and Y represents a hydrogen atom or an alkyl group having from 1 to 4 carbon atoms. In the general formula Q may be for example ethyl, isopropyl, n-butyl, pentyl, methoxyethyl, methoxypropyl or $CH_3OC_2H_4OC_2H_4—$. Suitable materials include di-butoxytitanium-bis-(acetylacetonate). These titanium complexes are, in general, known substances and a number of them are commercially available. They may be prepared for example by reacting an alcoholate of titanium, derived from e.g. ethanol, butanol, diethylene glycol monomethyl ether or phenol, with a diketone e.g acetylacetone.

The compositions of this invention may contain as optional constitutents other ingredients which are conventional to the formulation of silicone rubber sealants and the like. For example, the compositions will normally contain one or more reinforcing and/or extending fillers such as high surface area fume and precipitated silicas, crushed quartz, diatomaceous earths, calcium carbonate, barium sulphate, iron oxide, titanium dioxide and carbon black. The proportion of such fillers employed will depend on the properties desired in the elastomer-forming composition and the cured elastomer. Usually the filler content of the compositions will reside within the range from about 5 to about 150 parts by weight per 100 parts by weight of polydiorganosiloxane (A).

Other ingredients which may be included in the compositions are catalysts for increasing the rate of cure of the composition, pigments, agents (usually organosilicon compounds) for treating fillers and additional adhesion improving substances. Suitable curing catalysts are well known in the art and include the metal salts of carboxylic acids, for example lead octoate and dibutyltin dilaurate, dibutyltin diacetate, stannous octoate and dibutyltin diversatate. The catalyst may be employed in conventional amounts i.e. from about 0.05 to 10 parts by weight per 100 parts of (A). Another conventional ingredient which can be employed as a plasticiser and to reduce further the modulus of the cured elastomer is a polydimethylsiloxane having terminal triorganosiloxy groups wherein the organic substituents are e.g. methyl, vinyl or phenyl or combinations of these groups. Such polydimethylsiloxanes normally have a viscosity of from about 100 to about 100,000 mPa.s at 25° C. and can be employed in amounts up to about 80 parts per 100 parts of (A).

The compositions of this invention can be prepared by mixing (A), (B) and (C) in any order and employing any suitable mixing equipment.

Any optional additional ingredients may be incorporated at any stage of the mixing operation. However, it is generally preferred to add any curing catalyst required after mixing together the ingredients (A),(B) and (C) and the alkoxysilane if used. After mixing, the compositions may be stored under substantially anhydrous conditions, for example in sealed containers, until required for use.

Compositions according to the invention may be formulated as single part formulations which are stable in storage and have desired cure speed to provide cured seals of comparatively low modulus which have desired adhesion properties to glass, aluminium, zinc and concrete. These properties may be varied by varying the proportion of alkanolamine employed in the composition without varying the proportion of silane employed and without use of aminosilane.

The compositions of this invention cure on exposure to atmospheric moisture and may be employed in a variety of applications for example as coating, caulking and encapsulating materials. They are, however, particularly suitable for sealing joints, cavities and other spaces in articles and structures which are subject to relative movement. They are thus particularly suitable as glazing sealants and for sealing building structures and the decks of ships.

Of the following Examples, in which the parts are expressed by weight, compositions 3, 4, 5 and 6 illustrate the invention.

EXAMPLE 1

Four example compositions were prepared. A silanol-terminated polydimethylsiloxane having a viscosity at 25° C. of 50 Pa.s was thoroughly mixed with the oximosilane $CH_3Si(ON=C.CH_3.CH_3)_3$ the aminosilane $(C_2H_5O)_3Si(CH_2)_3NH_2$, the alkoxysilane $(CH_3O)_3SiMe$, the alkanolamine $CH_3C(CH_3)(NH_2)CH_2OH$, a dibutyltin salt, a trimethylsiloxy-terminated polydimethyl-siloxane having a viscosity of 1000 mPa.s at 25° C. and fume silica in the amounts shown in Table I. The components were mixed in a Drais planetary mixer fitted with a vacuum port.

The freshly prepared compositions were scraped into flat sheet moulds and exposed to the normal laboratory atmosphere (approximately 65% RH, 22° C.) for one week. Skin over time was tested periodically with the finger. The skin over time is that time at which it first occurs, that no more uncured material rests on the finger due to formation of a skin. The physical properties of the cured samples were then measured using dumbell-shaped test pieces (DIN Standard 2×4×approximately 40 mm) cut from the sheets, and a tensile test machine (FRANK Type 81560) and Shore A hardness test equipment. Shelf life was determined by ageing the composition at 50° C. for several weeks. One week ageing at 50° C. correlates with 4 weeks storage at room temperature and correspondingly 6½ and 13 weeks ageing at 50° C. corresponds with 26 and 52 weeks storage at room temperature respectively. The compositions were unaltered after 7 weeks ageing at 50° C.

Beads of the compositions were extruded from cartridges of the composition onto glass, aluminium, zinc and concrete. The beads were aged on their substrates for seven days under room conditions. At the end of this period a cut was made in each bead, using a knife inserted at the interface between the sealant bead and the substrate. The sealant bead was then pulled from the substrate by hand and the failure of the bead noted. Tearing of the bead, leaving a sealant layer adherent to the substrate, was recorded as cohesive failure.

The results are shown in Table II.

TABLE I

| Ingredient | Composition | | | |
|---|---|---|---|---|
| | 1 | 2 | 3 | 4 |
| Silanol-terminated polydimethylsiloxane | 100 | 100 | 100 | 100 |
| Trimethylsiloxy-terminated polydimethylsiloxane | 40 | 40 | 40 | 40 |
| Oximosilane | 8.15 | 8.15 | 815 | 8.15 |
| Aminosilane | 2 | — | — | — |
| Alkoxysilane | — | 2 | 2 | 2 |
| Alkanolamine | — | — | 0.5 | 1.0 |
| Fume silica | 14 | 14 | 14 | 14 |
| Dibutyltin salt | 0.3 | 0.03 | 0.03 | 0.03 |

TABLE II

| Property | Composition | | | |
|---|---|---|---|---|
| | 1 | 2 | 3 | 4 |
| Shelf life at 20° C. (weeks) | 52 | 26 | 26 | 26 |
| Skin over time (minutes) | 15 | 55 | 24 | 11 |
| Shore A | 15 | 14 | 14 | 14 |
| Elongate at break (%) | 600 | 700 | 700 | 700 |
| Modulus (MPA) | 0.3 | 0.3 | 0.3 | 0.3 |
| Tensile (MPA) | 1.4 | 1.3 | 1.3 | 1.3 |
| Adhesion to glass | 100% CF | 100% CF | 100% CF | 100% CF |
| Adhesion to aluminium | 100% CF | 60% CF | 100% CF | 100% CF |
| Adhesion to zinc | 100% CF | 0% CF | 0% CF | 100% CF |
| Adhesion to concrete | 100% CF | 0% CF | 0% CF | 100% CF |

CF = Cohesive failure.

As can be seen from these results the adhesion of all the compositions to glass is similar whereas the adhesion of compositions 3 and 4, especially that of composition 4, is superior to the adhesion of composition 2 to aluminium, zinc and concrete. Also it is noted that the skin over time (which gives a measure of the speed of curing of the composition) of compositions 3 and 4 is less than 30 minutes, and the skin over time of composition 4 is shorter than that of the other compositions.

EXAMPLE 2

Example 1 was repeated using monoethanolamine as the alkanolamine and using the ingredients in the proportions shown in Table III.

TABLE III

| Ingredient | Composition | |
|---|---|---|
| | 5 | 6 |
| Silanol-terminated polydimethylsiloxane | 100 | 100 |
| Trimethylsiloxy-terminated polydimethylsiloxane | 40 | 40 |
| Oximosilane | 8.15 | 8.15 |
| Alkoxysilane | 2 | 2 |
| Monoethanolamine | 0.68 | 1.34 |
| Dibutyltin salt | 0.03 | 0.03 |

Properties of the compositions were examined as in Example 1. The results are shown in Table IV.

TABLE IV

| Property | Composition | |
|---|---|---|
| | 5 | 6 |
| Shelf life at 20° C. (weeks) | 26 | 26 |
| Skin over time (minutes) | 35 | 11 |
| Shore A | 15 | 15 |
| Elongate at break (%) | 700 | 700 |
| Modulus (MPA) | 0.3 | 0.3 |
| Tensile (MPA) | 1.4 | 1.2 |
| Adhesion to glass | 100% CF | 100% CF |
| Adhesion to aluminium | 100% CF | 100% CF |
| Adhesion to zinc | 10% CF | 10% CF |
| Adhesion to concrete | 100% CF | 0% CF |

From Table IV it can be seen that when using an equivalent proportion of ethanolamine instead of the aminomethyl propanol of compositions 4, the cure speed of composition 5 is slower than that of compositions 1, 3 and 4 but faster than that of composition 2. Composition 6, which employs a larger proportion of monoethanolamine than composition 5, showed a cure speed comparable to that of composition 4. With regard to adhesion properties, composition 5 showed a better range of properties than composition 6 and both compositions 5 and 6 showed a better range of adhesion properties than compositions 2 and 3, but not as good a range as compositions 1 and 4.

That which is claimed is:

1. A composition curable to an elastomer in the presence of moisture and comprising the product obtained by mixing (A) 100 parts by weight of a polydiorganosiloxane having at least two silicon-bonded hydroxyl groups and wherein at least 50 percent of the total organic substituents are methyl groups, (B) from 1 to 40 parts by weight of one or more oxime silanes of the general formula $$R_{4-n}Si(ON=CR'_2)_n$$

wherein each R represents an alkyl group having less than 6 carbon atoms, a vinyl group, an allyl group or a phenyl group, each R' represents an alkyl group having from 1 to 6 carbon atoms or a phenyl group and n has an average value of from 2.1 to 3 and (C) from 0.1 to 1.5 parts by weight of one or more alkanolamines.

2. A composition according to claim 1 wherein the polydiorganosiloxane (A) is according to the general formula H(OSiR''$_2$)$_x$OH wherein substantially all of the groups R'' are methyl groups and x is an integer having an average value from 250 to 1500.

3. A composition according to claim 1 wherein the alkanolamine (C) is 2-amino-2-methyl-1-propanol.

4. A sealant composition comprising the product obtained by mixing (A) 100 parts by weight of a polydiorganosiloxane having terminal silicon-bonded hydroxyl groups according to the general formula HO—SiR''$_2$(OSiR''$_2$)$_x$OH wherein at least 50% of the groups R'' are methyl groups and x is an integer having an average value from: 250 to 1500; (B) from 4 to 18 parts by weight of one or more oxime silanes of the general formula $$R_{4-n}Si(ON=CR'_2)_n$$

wherein each R represents an alkyl group having less than 6 carbon atoms, a vinyl group, an allyl group or a phenyl group, each R' represents an alkyl group having from 1 to 6 carbon atoms or a phenyl group and n has an average value of from 2.1 to 3; (C) from 0.1 to 1.5 parts by weight of a monohydroxy alkanolamine containing a single primary amino group in the molecule; (D) 0 to 2.5 parts by weight of alkoxysilane of the general formula $R_{4-p}(SiOR')_p$ wherein R represents methyl, ethyl or vinyl, R' represents methyl, ethyl, methoxyethyl or methoxyethoxy and p has the value 2, 3 or 4; (E) from 5 to 150 parts by weight of finely divided filler and (F) from 0.05 to 10 parts by weight of a metal salt of a carboxylic acid as catalyst.

5. A composition according to claim 1 wherein the oxime silane (B) is methyl tris(dimethylketoxime) silane and is present in the amount of 4 to 18 parts by weight per 100 parts by weight of (A).

6. A composition according to claim 1 further comprising, per 100 parts by weight of (A), not more than 2.5 parts by weight of alkoxysilane of the general formula $R_{4-p}Si(OR')_p$ wherein R represents methyl, ethyl or vinyl, R' represents methyl, ethyl or methoxyethyl and p has the value 2, 3 or 4.

7. A composition according to claim 1 further comprising, per 100 parts by weight of (A), 5 to 150 parts by weight of finely divided filler.

8. A composition according to claim 1 further comprising, per 100 parts by weight of (A), 0.5 to 10 parts by weight of a metal salt of a carboxylic acid as catalyst.

9. A cured elastomeric product of the composition of claim 1.

* * * * *